United States Patent [19]

Burton

[11] 3,846,367

[45] Nov. 5, 1974

[54] MINERAL REINFORCED NYLON COMPOSITION WITH HIGH IMPACT STRENGTH

[75] Inventor: Louis Lasseter Burton, Wilmington, Del.

[73] Assignee: E. I. du Pont de Nemours and Company, Wilmington, Del.

[22] Filed: May 24, 1973

[21] Appl. No.: 363,663

[52] U.S. Cl. ............................ 260/37 N, 260/857 R
[51] Int. Cl. ............................................. C08g 51/04
[58] Field of Search ....................... 260/37 N, 857 R

[56] References Cited
UNITED STATES PATENTS

| | | | |
|---|---|---|---|
| 2,193,529 | /1940 | Coffma | 260/78 R |
| 2,374,137 | 4/1945 | Salisbury | 260/78 R |
| 2,849,415 | 8/1958 | Stott | 260/37 |
| 2,852,485 | 9/1958 | Stott | 260/37 |
| 3,290,165 | 12/1966 | Iannicelli | 260/37 N X |
| 3,418,268 | 12/1968 | Hedricks | 260/37 |
| 3,419,517 | 12/1968 | Hedricks | 260/37 N |
| 3,427,277 | 2/1969 | Davis | 260/33.4 |
| 3,557,544 | 1/1971 | Simons | 57/140 |

*Primary Examiner*—Morris Liebman
*Assistant Examiner*—Richard Zaitlen

[57] ABSTRACT

A composition containing polyhexamethylene adipamide and polycaprolactam. 8 to 20% by weight of the total polyamide is polycaprolactam. Said composition also contains a mineral reinforcing filler in the amount of 25 to 45 percent by weight. Said composition also contains a silane coupling agent. Said composition has improved toughness and notched izod impact strength.

10 Claims, No Drawings

MINERAL REINFORCED NYLON COMPOSITION WITH HIGH IMPACT STRENGTH

This invention relates to polyamide compositions of improved toughness and improved impact strength containing reinforcing mineral fillers. More particularly, this invention relates to a blend of nylon 66 polymer and nylon 6 polymer containing mineral reinforcing filler bonded to the polyamide by means of a silane coupling agent.

It is known in the art to reinforce polyamide materials with various reinforcing fillers, for example, glass, asbestos, fibrous wollastonite, silica, and the like. For example, see British Patent No. 963,773 and U.S. Pat. No. 3,419,517. These patents also disclose it to be conventional to employ a silane coupling agent to bond the mineral filler to the polyamide. U.S. Pat. No. 3,419,517 discloses that the polyamide employed may be a 6 nylon or a 66 nylon or a blend of different polyamides, see Column 3, lines 1 to 44 of said patent.

It is also known in the art to blend 66 nylon, the nylon formed by the reaction of hexamethylene diamine and adipic acid, and 6 nylon, the nylon formed by the polymerization of polycaprolactam, in order to prepare a molded article having improved surface characteristics.

It has now been found that a blend of nylon 66 and nylon 6 containing from 8 to 20 percent by weight 6 nylon and mixed with from 25 to 45 percent by weight mineral reinforcing filler has improved toughness and improved notched izod impact strength over such a composition not containing the 6 nylon. Furthermore, the notched izod impact is approximately a straight line function of the 6 nylon concentration in an unreinforced composition, whereas the notched izod for a reinforced composition containing the 6 nylon is significantly greater than the straight line function of the 6 nylon concentration.

The nylons used in the present invention should have conventional molecular weights for molding materials; that is, relative viscosities in the range of about 40 to 80.

The mineral reinforcing material employed can be any of those conventionally used in the prior art and may be in the form of a particulate reinforcing filler; that is, one having a length to diameter ratio not significantly greater than about 2:1 or the mineral reinforcing filler can have a much larger length to diameter ratio; for example, from about 10:1 to 50:1. Specific reinforcing materials found particularly useful are particulate silica having a length to diameter ratio of about 2:1 and alkaline earth silicates such as calcium silicate in the form of wollastonite and nepheline syenite, a sodium-aluminum silicate. Fibrous reinforcing minerals include fibrous wollastonite (a form of calcium silicate). Preferably, the minerals employed have a particle size such that 90 percent by weight or more are less than 15 microns and that the average particle size is in the range of 1 to 8 microns. Preferably, 98 percent of the particles are less than 10 microns and have an average particle size between 1 and 6 microns. The silicate fillers disclosed in U.S. Pat. No. 3,419,517 can be used in this invention. Mixtures of mineral fillers can also be employed.

The mineral reinforced compositions of this invention, like those of the prior art, require the presence of a silane coupling agent in order to effectively bond the mineral to the nylon. Suitable coupling agents are known in the prior art, for example, U.S. Pat. No. 3,290,165 discloses using gamma aminopropyltrioxysilane as a coupling agent. Epoxysilanes and vinyl silanes may also be employed. The amount of silane coupling agent needed in order to insure a good bond between the reinforcing agent and the nylon is about 0.25 to 2 percent by weight, based upon the weight of the mineral.

The silane compound may be coated directly on the reinforcing material prior to inclusion of the reinforcing material in the nylon, or the silane compound may be coated on the nylon or added to the nylon at the same time the reinforcing material is added.

The mixture of ingredients can be processed by melt blending all the components in an extrusion machine, such as a twin screw extruder. Alternatively, a 66 nylon may be blended with the reinforcing agent and the silane compound and then the nylon 6 component may be subsequently added to the process in another extrusion step. The composition of this invention may also be made in the injection molding of a mixture of 66 nylon molding powder containing the reinforcing mineral and 6 nylon molding powder. Mixtures of this type are called "cube blends."

In the following controls and examples, all parts and percentages are in parts by weight unless otherwise specified and all temperatures are in degrees centigrade.

CONTROL 1

A commercially available 66 nylon having a relative viscosity of between 41 and 52 was surface coated with 0.2 percent by weight of the ultimate composition of a commercially available gamma aminopropyltriethoxysilane. The 66 nylon comprised 59.8 percent by weight of the ultimate composition. To the surface coated nylon was added 40 percent by weight of a commercially available particulate wollastonite (calcium silicate). The particle size of the wollastonite was such that 90 percent of the particles were less than 15 microns. The wollastonite particles had a length to diameter ratio of about 8:1. These ingredients were premixed and then fed to a commercially available 28 millimeter twin screw extruder. The rate of feed was such that about 25 pounds per hour could have been fed through the extruder. The extruder was operated at a temperature varying between 265° and 280°C.; the screw speed in revolutions per minute varied from 175 to 225. The extruder had a vacuum port to remove volatile materials from the molten nylon. The product was extruded from a die on the extruder. The aperture of the die was about one-eighth inch in diameter. The product was quenched in water and then chopped into pellets about one-eighth inch in length. The product was dried overnight in an oven at 70° to 80°C. at about 20 inches of vacuum and then molded into test bars on a commercially available reciprocating screw machine having a three ounce capacity. The test bars were 5 × ½ × ⅛ inches in dimensions. Larger pieces (plaques) were molded on a commercially available six ounce reciprocating screw molding machine. The plaques had dimensions of 5 × 3 × ⅛ inches and 5 × 3 × 1/16 inches. The 3 ounce machine was operated at a temperature varying from 270°C. at the rear of the screw to 295°C. at the end of the screw nearest the mold. The mold temperature was 90°C. The screw rotated at about 60 revolutions per minute. The machine was set at a cycle of 15 or 20 seconds to injection mold and a hold-up time (cooling period) of 20 or 25 seconds. The control switch that controls the rate that the ram screw reciprocates was set in the "fast" position. The 6 ounce injection molding machine operated at a temperature varying from 280°C. at the rear of the screw to 295°C. at the end of the screw nearest the nozzle. The mold was at a temperature of 90°C. The cycle conditions were the same as the three ounce machine and the screw speed and ram speed were as specified for the three ounce machine. The physical properties of the molded test specimens were determined. The flexural modulus, as measured by ASTM Test D-790, on a dry-as-molded bar 5 × ½ × ⅛ inches was 664,000 pounds per square inch. The izod impact, as measured in foot pounds per inch on a notched bar, was 0.7 and on an unnotched bar was 16.

EXAMPLE 1

Using the same process conditions as specified in control 1 with the same amount of the same wollastonite and the same amount of the same silane composition, the nylon was varied. In this example, 16.7 percent by weight of the 66 nylon shown in the control was replaced by 16.7 percent by weight of a commercially available 6 nylon having a relative viscosity of about 45. The flexural modulus measured as 766,000 pounds per square inch and the notched izod impact was 1.0 and the unnotched was 20 foot pounds per inch.

EXAMPLE 2

The process conditions of Example 1 were repeated using the same amount of wollastonite, the same amount of the same coupling agent, and the same amount of 66 nylon. In this example, the 16.7 percent by weight 6 nylon was commercially available unextracted 6 nylon. (Unextracted nylon contains small amounts, perhaps as much as 6 percent by weight of the monomer caprolactam and low molecular weight polymers such as dimers, trimers, and the like). The flexural modulus of the molded test bar was 810,000 pounds per square inch, the notched izod impact was 1.0 and the unnotched izod impact was 19 foot pounds per inch. The 6 nylon employed in this example had a relative viscosity of about 65.

EXAMPLE 3

A composition similar to that prepared in control 1 except containing 33.3 percent by weight 6 nylon in place of 33.3 percent of the 66 nylon present was prepared using a commercially available 2 inches single screw extruder. The extruder had a screw with a length to diameter ratio of 31:1. The extruder operated at 40 to 50 revolutions per minute. The temperature at the rear of the screw was about 275°C. and at the die about 285°C. A vacuum of 27 to 28 inches was drawn from the vacuum port of the single screw extruder. Pellets were produced from the extrudate as in the control and molded test bars were manufactured in the same manner as specified in the control. The flexural modulus of the samples were measured and found to be 704,000 pounds per square inch. The notched izod impact was found to be 1.0 and the unnotched izod impact was 18 foot pounds per inch. The relative viscosity of the 6 nylon employed in this example was about 45. This 6 nylon was an extracted material.

CONTROL 2

The operating conditions of control 1 were repeated except in this instance 40 percent by weight of a commercially available nepheline syenite was employed as the reinforcing material. The other components were as specified in control 1. (Nepheline syenite is a sodium-aluminum silicate, containing about 9.8 percent sodium oxide, about 23.3 percent aluminum oxide ($Al_2O_3$) and about 61 percent silica oxide. It is sold commercially as Minex 7. The silicate employed has a length to diameter ratio of less than 2:1, and an average particle size of about 4.5 microns. 98 percent of the particles are less than 12 microns long). The molded parts were tested and found to have a flexural modulus of 769,000 pounds per square inch, a notched izod impact of 1.1 and an unnotched izod impact of 17 foot pounds per inch.

EXAMPLE 4

The process of control 2 was repeated only in this instance 16.7 percent of the 66 nylon employed was replaced by 16.7 percent of a commercially available unextracted 6 nylon. Molded specimens had a flexural modulus of 692,000 pounds per square inch, a notched izod impact of 1.2 and an unnotched izod impact of 36 foot pounds per inch.

CONTROL 3

The process of control 1 was repeated using a 40 percent by weight silica as the filler. All other components were as specified in control 1. The silica composition is commercially available and has a particle size of about 98 percent less than 10 microns, an average particle size of 3.2 microns, and a length to diameter ratio of about 1. The composition, like control 1, contained about 0.2 percent of the same silane coupling agent. The same composition was prepared in three different runs and gave slightly different properties in each run. The flexural modulus of the molded sample of run No. 1 was 806,000 pounds per square inch. The flexural modulus of run No. 2 was 725,000 pounds per square inch. The flexural modulus of run No. 3 was 787,000 pounds per square inch. The notched izod impact of run No. 1 was 0.98, for No. 2 was 1.02, for run No. 3 was 1.25. The unnotched izod impact for run No. 1 was 41, for run No. 2 was 41, for run No. 3 was 49. Gardner impact tests were run on each of the three runs with a 4 pound falling dart having an 0.25 inch radius tip on a 5 × 3 inch injected molded plaque mounted over a 1.5 inch diameter hole. The impact required for a crack on the reverse side or break was determined by a "staircase-method" as in ASTM D-3029-72. Using a plaque one-eighths inch thick and at a temperature of 23°C., the sample from run No. 1 measured 100 in.-lbs. The sample from run No. 2 measured 140 in.-lbs. and the sample from run No. 3 measured 90 in.-lbs. The sample from run No. 2 was tested in one-eighth inch sections at minus 30°C. by Gardner impact and measured 45 in.-lbs. The sample from run No. 3 measured under the same conditions and gave a reading of 60 in.-lbs. The sample from run No. 3 was also tested on the Gardner impact test in one-sixteenth inch sections at 23°C. and measured 18 in.-lbs.

EXAMPLE 5

The process conditions of control 3 were repeated using the same components except that 5 percent by weight of the 66 nylon employed was replaced by 5 percent of an unextracted commercially available 6 nylon. The flexural modulus of the composition measured under the same conditions was 697,000 pounds per square inch. The composition had a notched impact strength of 1.27 foot pounds per square inch and an unnotched izod impact of 47 foot pounds per square inch. The Gardner impact test was run on one-sixteenth inch thick sections at 23°C. and measured 100 in.-lbs.

EXAMPLE 6

The process conditions of control 3 were repeated using the same components except that 10 percent by weight of a 6 nylon was used in place of the same amount of 66 nylon. The 6 nylon was the unextracted type. Test bars molded from this material had a flexural modulus of about 683,000 pounds per square inch, a notched izod impact of 1.27 foot pounds per inch, an unnotched izod of 53, a Gardner impact of greater than 160 in.-lbs. at 23°C. in ⅛ inch sections, a Gardner impact of 80 in-lbs. at −30°C. in ⅛ inch sections and a Gardner impact at 23°C. in 1/16 inch sections of 70 in.-lbs. This example was repeated using a 6 nylon which was extracted having a relative viscosity of about 45 and similar results were obtained.

EXAMPLE 7

The process conditions of control 3 were repeated using the same components except that an unextracted 6 nylon in the amount of 16.7 percent by weight was used in place of the same amount per weight of 66 nylon. Test bars molded from this composition had a flexural modulus of about 690,000 pounds per square inch, a notched izod impact of 1.50, an unnotched izod impact of 41 foot pounds per inch, a Gardner impact of 120 in.-lbs. tested in ⅛ inch sections at 23°C., and a Gardner impact of 105 tested in ⅛ inch sections at −30°C. This example was repeated using an extracted 6 nylon in the same proportions and the results obtained were similar.

CONTROL 4

For purposes of comparison with Examples 5, 6 and 7, this control was run. Using the process conditions of control 3 and the same components except as specified, a series of test panels were prepared using 25 percent by weight of 6 nylon in place of the same weight proportion of 66 nylon. The flexural modulus for the test bars measured about 667,000 pounds per square inch. The test bars had an izod impact notched of 1.43 foot pounds per square inch and an unnotched izod impact of about 54 foot pounds per square inch. The test bars were subjected to Gardner impact test. In ⅛ inch sections at 23°C., the plaques had a Gardner impact reading of greater than 160 in.-lbs. The plaques were subjected to the same test at ⅛ inch sections at −30°C. and had a reading of 85. The plaques were subjected to Gardner impact at 23°C. in 1/16 inch sections and had a reading of 115. The example was repeated using a 6 nylon which was extracted and similar results were obtained.

CONTROL 5

For purposes of comparison with Examples 5, 6 and 7, this control was run. The process conditions of control 3 were repeated, using the same components except as specified. 50 percent by weight of the 6 nylon was used as a replacement for a like amount of the 66 nylon. The 6 nylon was unextracted. Test bars molded from this material had a flexural modulus of 637,000 pounds per square inch, a notched izod impact of 1.56 foot pounds per inch, an unnotched izod greater than 60 foot pounds per inch and a Gardner impact test on 1/16 inch sections at 23°C. gave a reading of 80 in.-lbs. This example was repeated using the same amount of an extracted 6 nylon and similar results were obtained.

CONTROL 6

For purposes of comparison with Examples 5, 6 and 7, this control was run. The process conditions of control 3 were repeated except for a 30°C. lower compounding temperature using 6 nylon in place of the 66 nylon. The other components were the same as in control 3. The 6 nylon employed was the extracted type nylon having a relative viscosity of about 45. Test bars molded from these samples showed that the product had a flexural modulus of about 760,000 pounds per square inch, a notched izod impact of about 1.42, an unnotched izod impact of about 53 foot pounds per inch, a Gardner impact of 60 in.-lbs. measured in ⅛ inch sections at 23°C., a Gardner impact of 55 measured on ⅛ inch sections at −30°C. and a Gardner impact of 140 measured at 23°C. on 1/16 inch sections.

CONTROL 7

For purposes of comparison, the flexural modulus of 66 nylon extruded as in control 1 was measured and found to be 422,000 pounds per square inch. It had a notched izod impact of 0.83. A blend prepared as in control 1 of 90 percent 66 nylon and 10 percent of the unextracted 6 nylon used in the above examples had a flexural modulus of 399,000 pounds per square inch and a notched izod impact of 0.88 foot pounds per inch. A blend of 20 percent 6 nylon and 80 percent nylon had a flexural modulus of 385,000 and an izod impact notched of 0.91. A blend of 50 percent nylon 6 and 50 percent nylon 66 had a flexural modulus of 346,000 pounds per square inch and a notched izod impact of 1.10.

CONTROL 8

Using process conditions substantially the same as Example No. 3, a fibrous wollastonite composition was used as the filler. This filler has a length to diameter ratio of about 12:1 with an average particle size in the longest dimension of about 15 microns. 40 percent by weight of the wollastonite was used with 66 nylon. The product had a flexural modulus of 935,000 pounds per square inch, a notched izod impact of 1.18 and an unnotched izod impact of 18 foot pounds per inch.

EXAMPLE 8

A composition was prepared in accordance with control 5 except that an unextracted 6 nylon was used in the amount of 16.7 percent by weight to replace a similar amount of 66 nylon. The composition had a flexural modulus of 885,000 pounds per square inch, a notched izod impact of 1.10 foot pounds per inch and an unnotched izod impact of 32 foot pounds per inch.

CONTROL 9

The 66 nylon nylon containing finely divided silica in the amount of 40 percent by weight and 0.2 percent by weight of the silane coupling agent of control 1 was produced. This composition contained 60 percent by weight 66 nylon. The composition was molded into 5 × 3 × ⅛ inch plaques and subjected to a Gardner impact test at different impact heights corresponding to impacts of 80, 100, 120 140 and 160 in.-lbs. One-fourth of the samples failed in the 80 in.-lbs. test, three-fourths failed in the 100, 120 and 140 in.-lbs. test and all of the samples failed in the 160 in.-lbs. test.

In a similar run using a composition containing 60 percent by weight nylon 6, the other components being the same as in the previous paragraph, 100 percent of the samples failed at 80 in.-lbs. and at 100 in.-lbs. No test was run at 120, 140 and 160 since failure was a certainty.

EXAMPLE 9

For purposes of comparison with control 10, a blend containing 10 percent by weight nylon 6 substituted for an equal amount of nylon 66. The nylon 6 was extracted nylon 6. The samples molded from this material were tested by the Gardner impact test in the same manner as in the control and all of the samples passed at 80 in.-lbs. One out of 4 failed at 100 in.-lbs. They all passed 120 in.-lbs. and one-fourth failed at 140 and 160 in.-lbs.

In a similar run using 16.7 percent by weight 6 nylon substituted for an equal weight 66 nylon, all of the samples passed the 80, 100 and 120 in.-lbs. impact test and 1 failed the 140 in.-lbs. test and 1 failed the 160 in.-lbs. test.

In a similar run, a blend of 15 percent by weight of 6 nylon was blended with 45 percent by weight 66 nylon. The composition was otherwise the same as control 6. This composition passed the Gardner impact test at 80 in.-lbs. One-fourth of the samples failed at 100 in.-lbs. Three-fourths of the samples failed at 120 in.-lbs. All of the samples failed at 140 and at 160 in.-lbs.

I claim:

1. A polyamide composition comprising (1) a blend of polycaprolactam and polyhexamethylene adipamide, said blend containing between 8 and 20 percent by weight polycaprolactam based on the weight of the total polyamide present, said blend comprising 55 to 75 percent by weight of the composition; (2) 25 to 45 percent by weight of the composition of a mineral reinforcing agent and (3) a silane coupling agent in the amount of 0.25 to 2 percent by weight of the mineral reinforcing agent.

2. The composition of claim 1 in which polycaprolactam is present in the amount of 15 to 18 percent by weight of the total polyamide present.

3. The composition of claim 2 in which the mineral reinforcing agent is selected from the class consisting of silica and silicates.

4. The composition of claim 3 in which 75 percent by weight of the mineral reinforcing agent is less than 10 microns in its largest dimension.

5. The composition of claim 4 in which the silane coupling agent is selected from the class consisting of amino, epoxy and vinyl silane.

6. The composition of claim 1 in which the silica coupling agent is 3-aminopropyltriethoxysilane.

7. The composition of claim 1 in which the polyamide components have a relative viscosity between 40 and 80.

8. The composition of claim 4 in which the mineral reinforcing agent is fibrous wollastonite.

9. The composition of claim 4 in which the mineral reinforcing agent is silica.

10. The composition of claim 1 containing 2 to 15 percent by weight fibrous potassium titanate.

* * * * *